(12) United States Patent
Sugiyama

(10) Patent No.: US 10,955,723 B2
(45) Date of Patent: Mar. 23, 2021

(54) OPTICAL MODULATOR, AND OPTICAL TRANSCEIVER MODULE USING THE SAME

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 11 days.

(21) Appl. No.: 16/268,768

(22) Filed: Feb. 6, 2019

(65) Prior Publication Data

US 2019/0271896 A1    Sep. 5, 2019

(30) Foreign Application Priority Data

Mar. 2, 2018 (JP) ................................. 2018-037216

(51) Int. Cl.
*G02F 1/225*     (2006.01)
*G02F 1/21*      (2006.01)

(52) U.S. Cl.
CPC ............ *G02F 1/2255* (2013.01); *G02F 1/218* (2013.01); *G02F 1/2257* (2013.01); *G02F 2001/212* (2013.01); *G02F 2201/12* (2013.01)

(58) Field of Classification Search
CPC ...... G02F 1/2255; G02F 1/2257; G02F 1/218; G02F 2201/12; G02F 2001/212
See application file for complete search history.

(56) References Cited

U.S. PATENT DOCUMENTS

| | | | | |
|---|---|---|---|---|
| 7,809,218 B2 * | 10/2010 | Iwata | ..................... | G02F 1/0356 385/1 |
| 9,291,837 B1 * | 3/2016 | Yap | ......................... | G02F 1/011 |
| 9,551,887 B2 * | 1/2017 | Ichikawa | ................ | G02F 1/025 |
| 9,599,843 B2 * | 3/2017 | Kondou | .................. | G02F 1/035 |
| 9,664,931 B1 * | 5/2017 | Yap | ......................... | G02F 1/2255 |
| 10,185,165 B2 * | 1/2019 | Hosokawa | .............. | G02F 1/035 |

(Continued)

FOREIGN PATENT DOCUMENTS

CA   2990357 A1 * 12/2016   ............. H01P 3/081
JP   2006-47746      2/2006

(Continued)

OTHER PUBLICATIONS

Patent Abstracts of Japan English abstract for Japanese Patent Publication No. 2006-47746, published Feb. 16, 2006.

(Continued)

*Primary Examiner* — Peter Radkowski
(74) *Attorney, Agent, or Firm* — Staas & Halsey LLP

(57) ABSTRACT

An optical modulator has an optical input port and an optical output port provided on a same end of a substrate; an optical waveguide pair formed in the substrate and configured to form a Mach-Zehnder interferometer, one end of the optical waveguide pair being connected to the optical input port and the other end of the optical waveguide pair being connected to the optical output port, the optical waveguide pair having a bending part; a groove provided along the optical waveguide pair in the bending part; and a signal electrode that applies a high-frequency electrical signal to the optical waveguide pair, wherein the signal electrode has an expanded section having an increased cross sectional area at a section intersecting the groove.

11 Claims, 11 Drawing Sheets

(56) References Cited

U.S. PATENT DOCUMENTS

| | | | |
|---|---|---|---|
| 10,247,999 B1* | 4/2019 | Yap | G02F 1/2255 |
| 10,522,892 B2* | 12/2019 | Kikuchi | G02F 1/025 |
| 2006/0029319 A1 | 2/2006 | Sugiyama | |
| 2009/0154867 A1* | 6/2009 | Iwata | G02F 1/0356 |
| | | | 385/2 |
| 2010/0119189 A1* | 5/2010 | Nasu | G02B 6/12007 |
| | | | 385/1 |
| 2015/0370095 A1* | 12/2015 | Kondou | G02F 1/035 |
| | | | 385/2 |
| 2016/0062155 A1* | 3/2016 | Ichikawa | G02F 1/025 |
| | | | 385/3 |
| 2018/0039104 A1* | 2/2018 | Hosokawa | G02F 1/0316 |
| 2018/0175474 A1* | 6/2018 | Kikuchi | G02F 1/025 |

FOREIGN PATENT DOCUMENTS

| | | | |
|---|---|---|---|
| JP | 2009-181108 | 8/2009 | |
| WO | WO-2016208202 A1 * | 12/2016 | H01P 5/087 |
| WO | WO 2018002656 A1 * | 1/2018 | |
| WO | WO 2018002658 A1 * | 1/2018 | |

OTHER PUBLICATIONS

Patent Abstracts of Japan English abstract for Japanese Patent Publication No. 2009-181108, published Aug. 13, 2009.

\* cited by examiner

US 10,955,723 B2

OPTICAL MODULATOR, AND OPTICAL TRANSCEIVER MODULE USING THE SAME

CROSS-REFERENCE TO RELATED APPLICATIONS

This application is based upon and claims priority to earlier filed Japanese Patent Application No. 2018-037216 filed Mar. 2, 2018, which is incorporated herein by reference in its entirety.

FIELD

The present invention relates to an optical modulator and an optical transceiver module using the same.

BACKGROUND

Generally, in an optical modulator, radio frequency (RF) electrodes and direct current (DC) electrodes are used to apply an electric field to the optical waveguides. A plurality of RF electrodes are provided according to the number of optical waveguides required to generate a multi-level optical signal. A drive signal of several tens of Gbps is input to each of the RF electrodes. On the other hand, a bias voltage is applied to the DC electrodes. The bias voltage is regulated such that the on/off state of the input RF signal corresponds to on and off of the optical signal output from the optical modulator.

For a material of the optical modulator chip, a crystal material such as lithium niobate (LN) having an electro-optic effect is used. Although the optical loss is small in LN optical waveguides, the electro-optic effect is not sufficiently large and accordingly, the length of the electrodes is increased in order to maintain the driving voltage low. For this reason, the length of the modulator chip itself becomes as long as 70 mm to 90 mm. Besides, an input optical fiber and an output optical fiber are connected to either end of the package that accommodates the modulator chip. The total length of the package also increases.

As illustrated in FIG. 1, by bending the entirety of the optical waveguides 111 so as to turn them back on the modulator chip 100, the length of the modulator chip can be shortened to 35 mm to 40 mm. See, for example, Japanese Laid-open Patent Publication No. 2006-47746. With this configuration, the input optical fiber and the output optical fiber are arranged on the same end of the package 300, and the overall length of the package 300 can be shortened.

A turn-back part 110 is formed by bending waveguides designed so as to change the direction of propagation of light by 180 degrees. In order to reduce the chip size, it is desired to decrease the radius of curvature of the bending waveguides; however, the decreasing the radius of curvature of the waveguides may cause the radiation loss of the light travelling through the waveguides to increase.

To prevent the light from escaping toward the outer curve, a low-refractive part 120 such as a groove is provided to the substrate along the outer curve of the bending waveguides in the turn-back part 110.

Meanwhile, RF signals are applied from the RF input terminals to the modulator chip 100 via an interposer 201, and a DC voltage is applied from the DC input terminals to the modulator chip 100 via the relay board 202. In the configuration of FIG. 1 in which the DC input terminals and the RF input terminals are arranged on the same side of the modulator chip 100, the RF signals are supplied to the optical waveguides 111, passing through a space between the group of DC electrodes and the turn-back part 110. Because the space is required between the DC electrodes and the turn-back part 110 in order to introduce the RR electrodes, the length of the DC electrodes becomes short.

As the DC electrodes are shortened, the DC control voltage level increases. Besides, since the DC input terminals and the RF input terminals are adjacent to each other, crosstalk arises between DC signals and the RF signals.

SUMMARY

According to one aspect of the invention, an optical modulator has a substrate;

an optical input port and an optical output port provided on a same end of the substrate; an optical waveguide pair provided in the substrate and configured to form a Mach-Zehnder interferometer, one end of the optical waveguide pair being connected to the optical input port and the other end of the optical waveguide pair being connected to the optical output port, the optical waveguide pair having a bending part;

a groove provided along the optical waveguide pair in the bending part; and a signal electrode that applies a high-frequency electrical signal to the optical waveguide pair, wherein the signal electrode has an expanded section having an increased cross sectional area at a section intersecting the groove.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Figure 1:
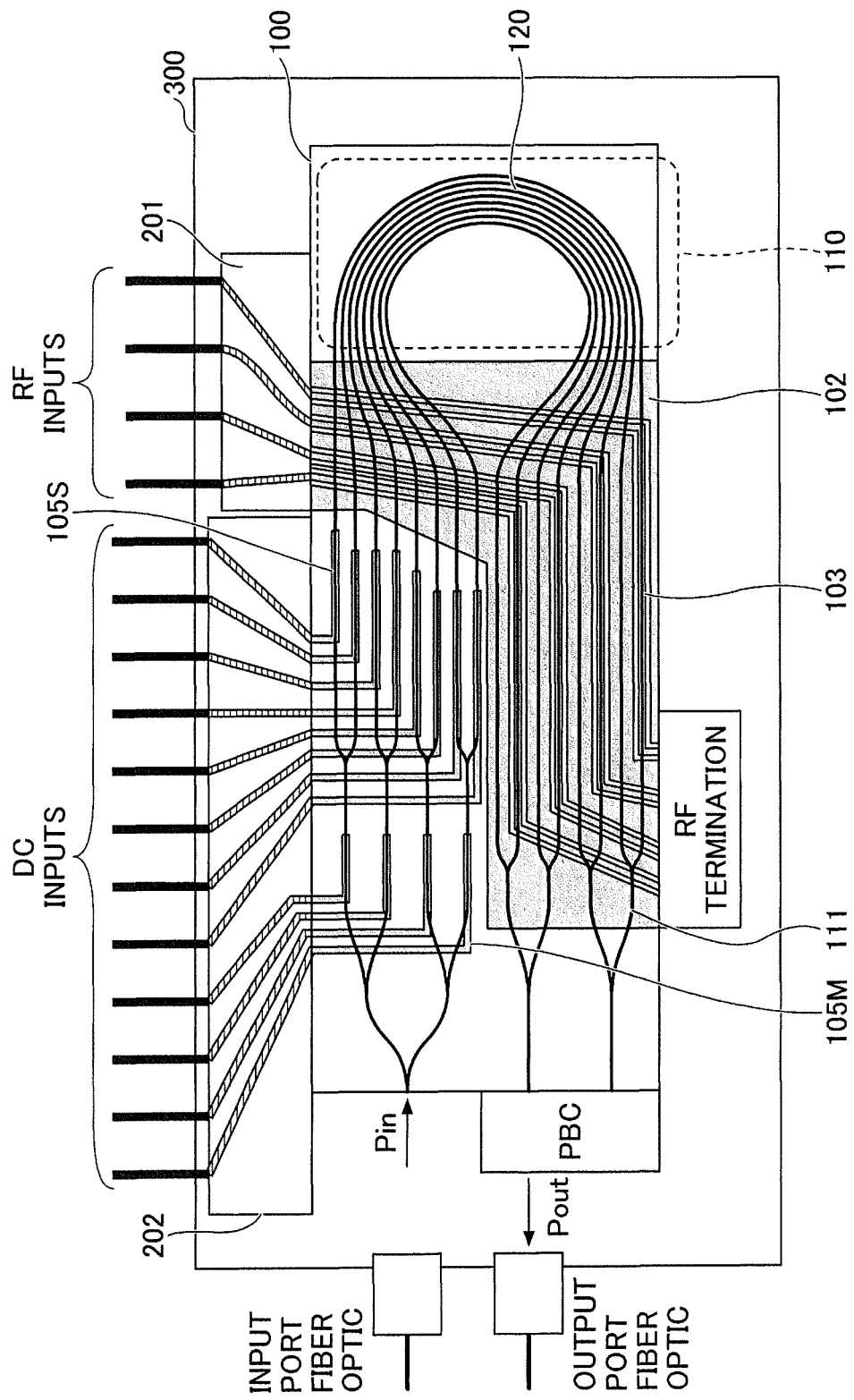
FIG. 1 is a diagram for explaining a technical problem arising in an optical modulator having a turn-back part.
Figure 2:
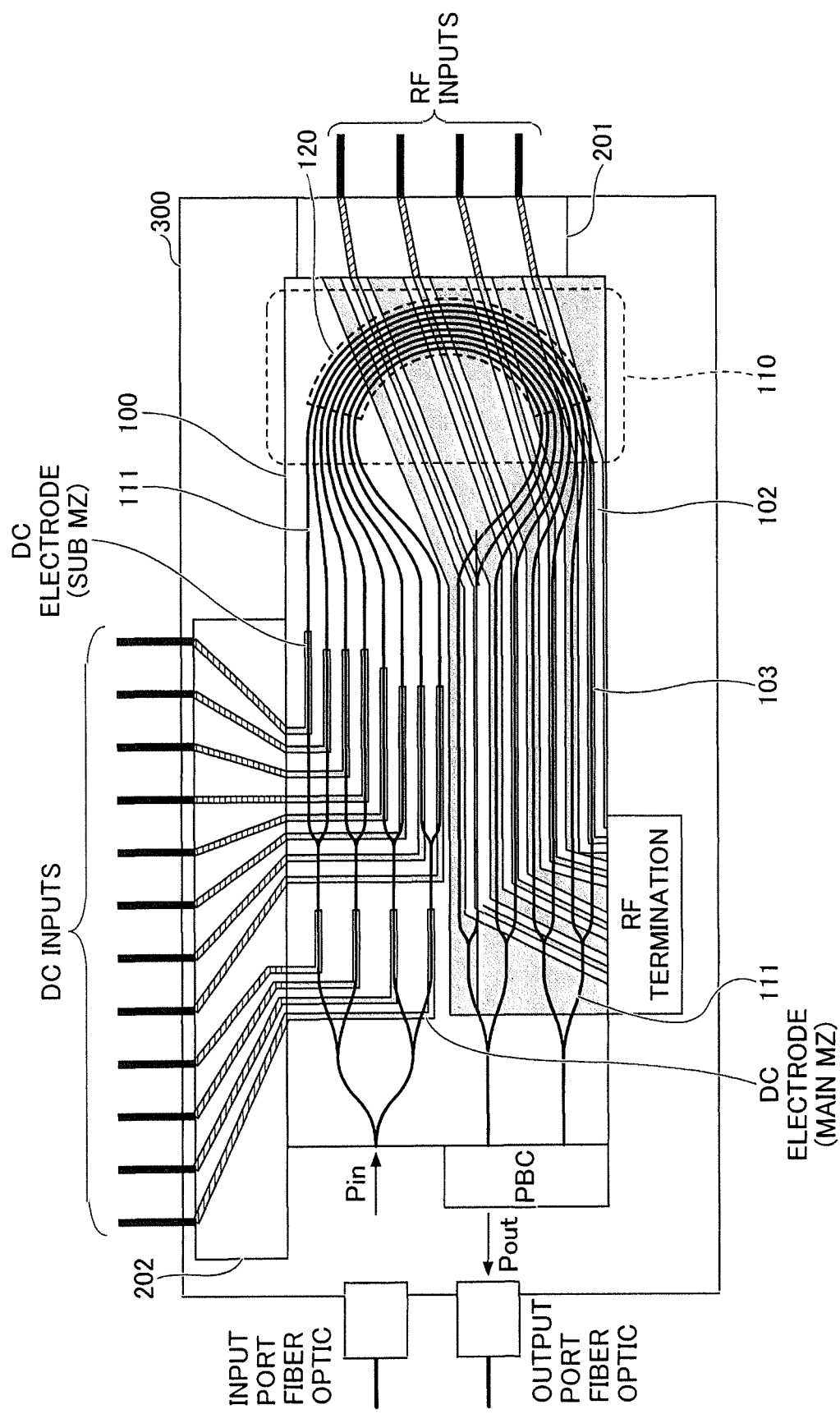
FIG. 2 illustrates a layout design conceived by the inventor to solve the technical problem arising in the configuration of FIG. 1.

To solve the above-explained technical problem, a configuration of FIG. 2, in which the RF input terminals are arranged at the opposite end of the fiber input/output port, may be employed. By separating the RF input terminals from the DC input terminals, crosstalk can be reduced and the DC electrodes have a sufficient length.

However, with this configuration, RF electrodes intersect the grooves formed in the low-refractive part 120 along the bending waveguides of the turn-back part 110. Electrical disconnection is likely to occur and the production yield of the modulator chip may decrease. Besides, due to variations in the manufacturing process or the process conditions, the characteristic impedance of the signal lines may greatly change and the high-frequency signals may be reflected easily.

Therefore, a novel structure that achieves a high production yield of a downsized optical modulator and reduces variations in characteristic impedance is desired.

First Embodiment

Figure 3:
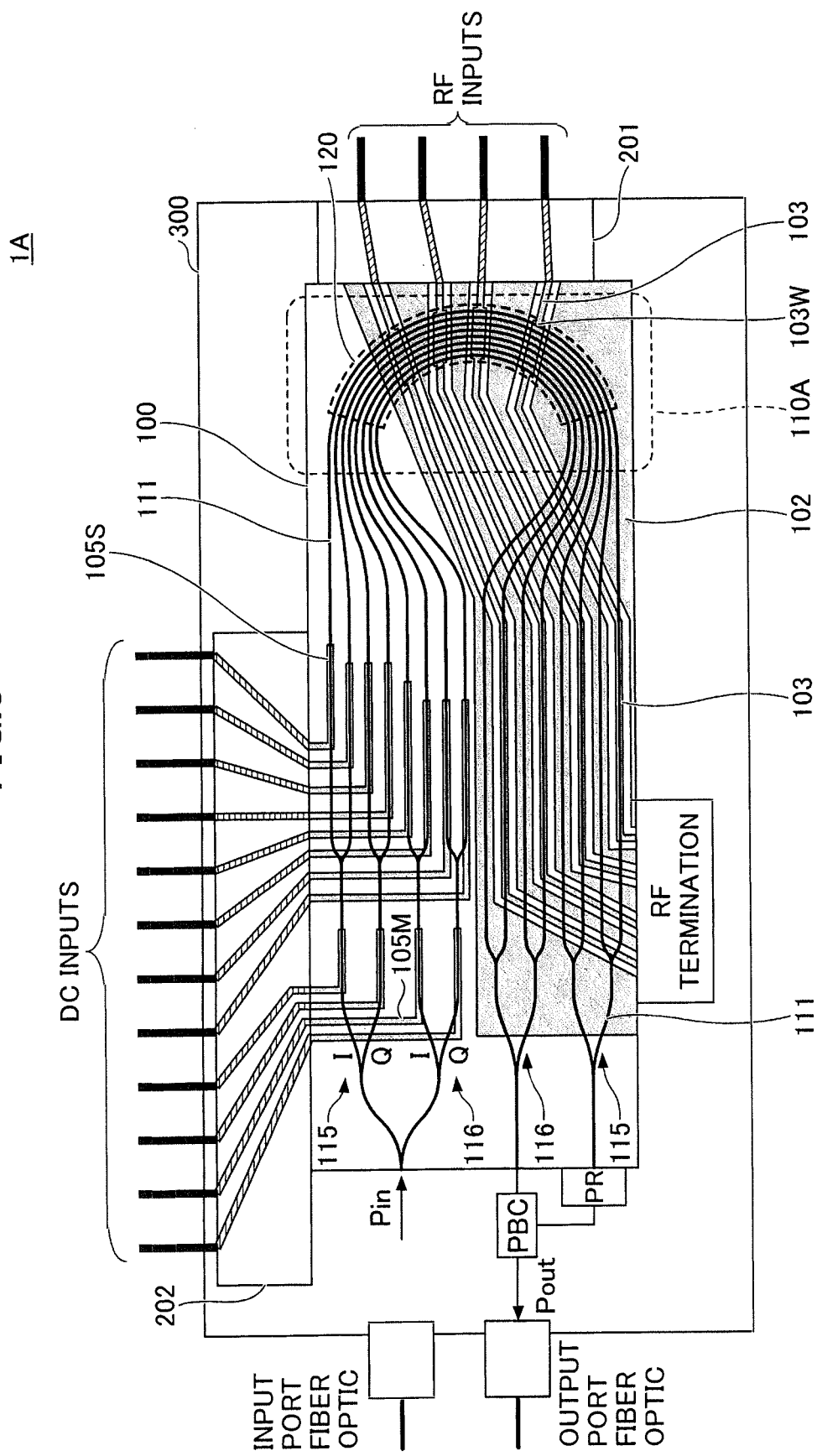
FIG. 3 illustrates a configuration of an optical modulator according to the first embodiment.

FIG. 3 is a schematic diagram of an optical modulator 1A of the first embodiment. The optical modulator 1A has a modulator chip 100 on which a set of optical waveguides 111 are formed. The modulator chip 100 may be arranged in a package 300, together with interposer boards 201 and 202 through which the bias voltage and the high frequency drive signal are supplied externally.

In the modulator chip 100, the optical waveguides 111 formed on the substrate 101 are bent making a 180-degree turn in the turn-back part 110A, in which a direction of light propagating through the optical waveguides 111 is changed by almost 180 degrees. An optical input port $P_{in}$ and an optical output port $P_{out}$ are provided at the same end of the substrate 101, either side along the longitudinal axis of the substrate 101. One end of the optical waveguides 111 is connected to the optical input port $P_{in}$ and the other end is connected to the optical output port $P_{out}$. A modulator is formed by the optical waveguides 111 extending between the optical input port $P_{in}$ and the optical output port $P_{out}$.

In the example of FIG. 3, a polarization multiplexing is employed using an IQ modulator 115 and an IQ modulator 116 of a Mach-Zehnder interferometer (MZI) type arranged in parallel to each other. The IQ modulator 115 has a pair of optical waveguides forming an in-phase (I) channel and a pair of optical waveguides forming a quadrature-phase (Q) channel. Similarly, the IQ modulator 116 has a pair of optical waveguides providing an I channel, and a pair of optical waveguides providing a Q channel. Each of the IQ modulators 115 and 116 generates a 2-bit optical signal by quadrature phase shift keying (QPSK), and a total of a 4-bit optical signal is output from the modulator chip 100.

Each of the IQ modulator 115 and the IQ modulator 116 has a MZI-based I-channel waveguide pair and a MZI-based Q-channel waveguide pair. The IQ modulators 115 and 116 may be called "main MZIs". Each of the I-channel waveguides and the Q-channel waveguides is further branched into two waveguides to form a MZI-based waveguide pair. The I-channel branches and the Q-channel branches of the IQ modulators 115 and 116 may be called "sub MZIs." In the turn-back part 110A, there are four pairs of optical waveguides forming Mach-Zehnder interferometers, and the total of eight optical waveguides 111 are curved altogether at a predetermined radius of curvature.

The substrate 101 may be a crystal substrate having an electro-optic effect, such as lithium niobate ($LiNbO_3$), lithium tantalate ($LiTaO_2$) or the like. The optical waveguides 111 that form the IQ modulators 115 and 116 may be fabricated in the substrate 101 by patterning a metal such as titanium with a high solid solubility with respect to the electro-optical crystal. The patterned substrate is then subjected to thermal diffusion, proton exchange, and other processes, whereby light-transmitting optical waveguides 111 with high index of refraction are fabricated.

The optical waveguides 111 extend substantially in parallel from the optical input port $P_{in}$ until shortly before reaching the turn-back part 110A, except for the Y-junctions. Then, the distance between the adjacent waveguides gradually narrows toward the turn-back part 110A, in which the optical waveguides 111 are bent at a small radius of curvature. Upon exiting the turn-back part 110A, the distance between adjacent waveguides gradually increases and the optical waveguides 111 extend again in parallel toward the light output port $P_{out}$, except for the Y-junctions.

A DC voltage and RF signals are applied to the modulator chip 100 making use of the areas in which the optical waveguides 111 extend in parallel, thereby increasing the length of the electrodes and reducing the DC bias control voltage and the RF drive voltages.

In the turn-back part 110A, radiation loss of light would potentially occur in the curved waveguides. As the radius of curvature of the optical waveguide 111 becomes smaller for downsizing the modulator chip 100, the radiation loss would increase. To prevent radiation loss, a low refractive structure 120 is provided to the turn-back part 110A with the bending optical waveguides 111. The low refractive structure 120 has an air layer having an index of refraction lower than that of the optical waveguides 111.

Figure 4A:
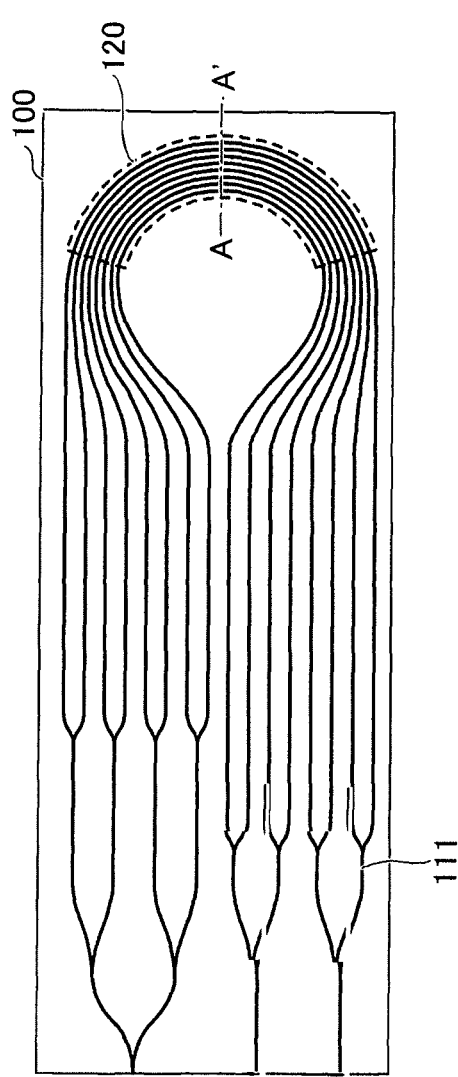
FIG. 4A is a plane view of the optical modulator chip.
Figure 4B:
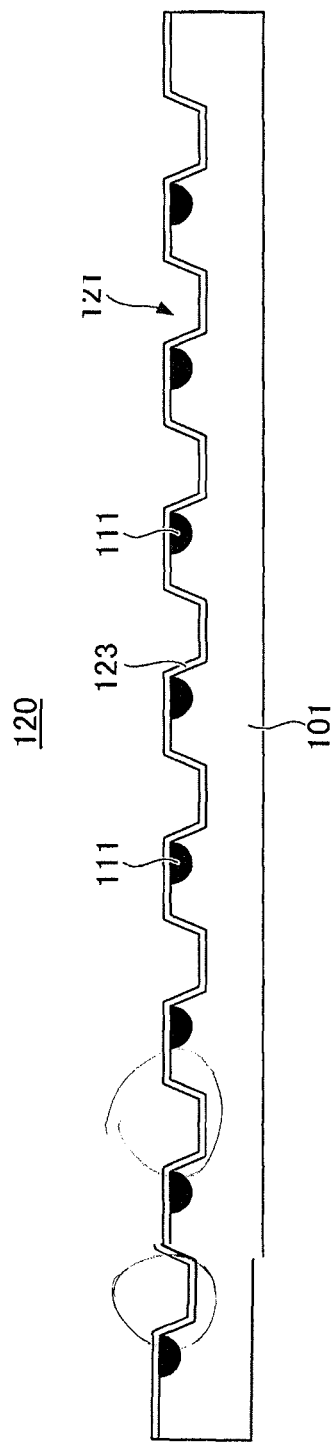
FIG. 4B is a cross-sectional view taken along the A-A' line of FIG. 4A, illustrating a groove structure provided along the bending waveguides of FIG. 3 and FIG. 4A.

FIG. 4A and FIG. 4B illustrate a groove configuration of the low refractive structure 120 provided in the turn-back part 110A. FIG. 4A is a plane view of the optical waveguides 111 and FIG. 4B is a cross-sectional view taken along the A-A' line.

Grooves 121 are formed in the substrate 101 along the outer curve of the respective optical waveguides 111 by, for example, dry etching. Inside the groove 121 is an air layer whose index of refraction is lower than that of the optical waveguide 111. Each of the optical waveguides 111 extends between grooves 121, one formed along the outer curve of a corresponding optical waveguide 111 and one provided along the outer curve of the next inner optical waveguide 111, whereby a pseudo ridge waveguide is formed. This configuration can enhance the confinement of light in the optical waveguide 111 and suppress radiation loss from the curved waveguide. The entire surface of the substrate 101 in which the optical waveguides 111 and the grooves 121 are formed is covered with a buffer layer 123 such as $Al_2O_3$, $SiO_2$, or other suitable material.

Returning to FIG. 3, DC electrodes are provided to the parallel sections of the waveguides extending between the optical input port $P_{in}$ and the turn-back part 110A. For example, DC electrodes 105M are provided to the I channel and the Q channel of each of the IQ modulators 115 and 116 (which form the main MZI), and DC electrodes 105S are provided to the optical waveguide pairs forming sub MZIs in each of the I and Q channels. The DC electrodes 105M and 105S may be collectively referred to as "DC electrodes 105" as necessary.

The DC electrode 105 is arranged over the optical waveguides 111 via the buffer layer 123. The DC input terminals that externally supply DC voltages are connected to the associated DC electrodes 105 via the interposer board 202 to apply the DC bias voltages to the optical modulator.

Signal electrodes 103 to which radio frequency (RF) signals are applied are provided to the straight parts of the optical waveguides 111 extending between the turn-back part 110A and the light output port $P_{out}$. The signal electrodes 103 are provided to each of the four sub MZIs. RF input terminals for externally inputting high-frequency drive signals are connected to the associated signal electrodes 103 via the interposer board 201.

The interposer board 201 is provided to the end face of the modulator chip 100, opposite to the optical input port $P_{in}$ and the optical output port $P_{out}$. Because of this arrangement, the RF signals are input to the IQ modulators 115 and 116 across the grooves 121 formed along the curved waveguides in the turn-back part 110A. If the condition of vapor deposition or dry plating of a metal electrode material onto the inner walls of the grooves 121 may vary due to fine differences in the process condition, physical or electrical disconnection would potentially occur at the edges of the grooves 121.

In the embodiment, variations in process conditions are compensated for by partially increasing the cross-sectional area of the signal electrodes 103 at the position intersecting the grooves 121. The cross-sectional area of the signal electrodes 103 can be increased by, for example, increasing the line width of the signal electrodes 103.

Figure 5:
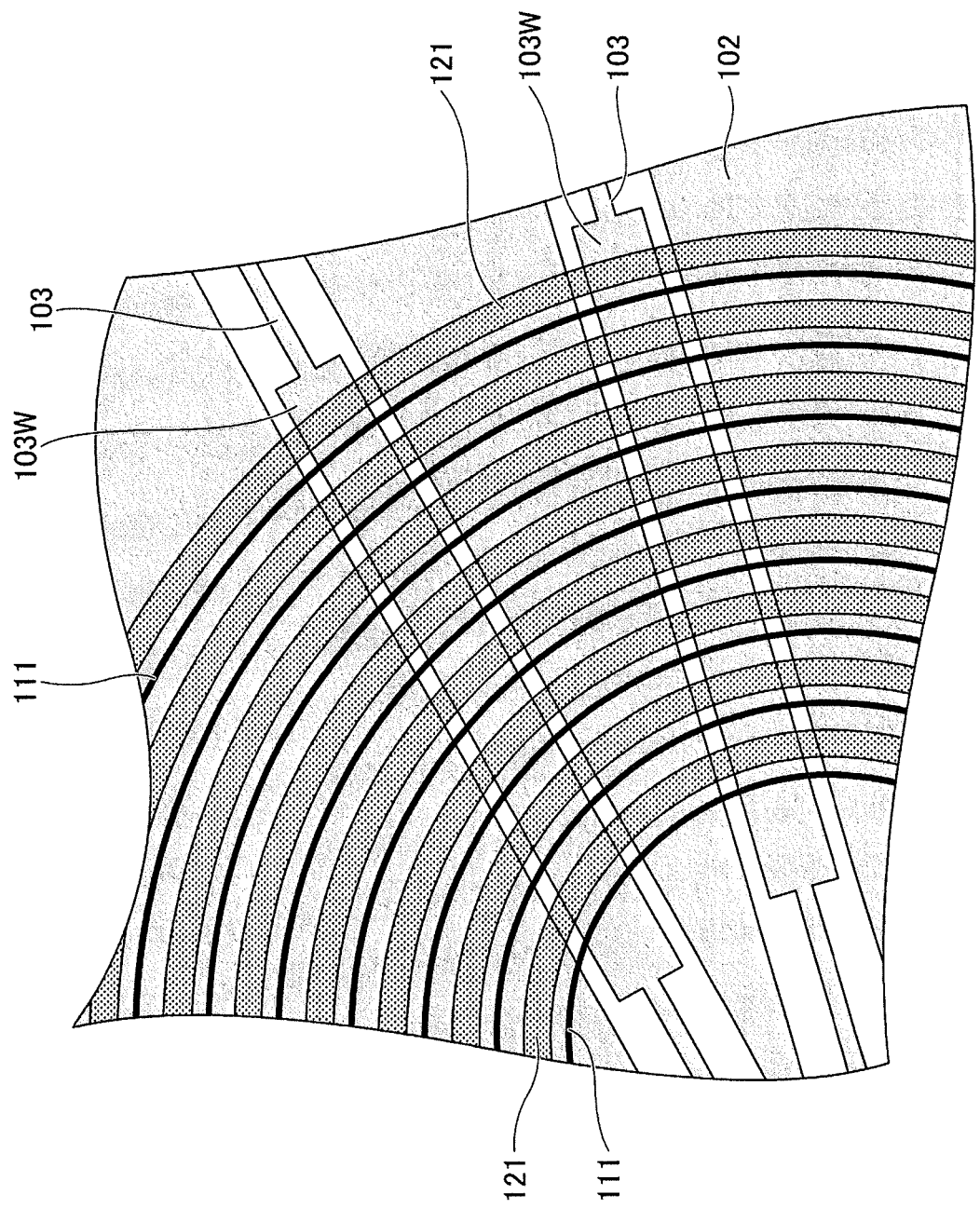
FIG. 5 is an enlarged view of the turn-back part of FIG. 3.

FIG. 5 is an enlarged view of the turn-back part 110A illustrated in FIG. 3. The signal electrodes 103 connected to the interposer board 201 intersect the curved optical waveguides 111 and the grooves 121 provided along the outer curves of the optical waveguides 111 in the turn-back part 110A. In the low-refractive part 120 (see FIG. 3), the signal electrodes 103 have expanded sections 103W with an increased width at a section intersecting the grooves 121. By partially increasing the width of the signal electrodes, the cross-sectional area of the signal electrodes 103 is increased.

By increasing the cross-sectional area of the signal electrodes 103 at the location intersecting the grooves 121 disconnection or degradation of the interconnects can be prevented and the reliability of the interconnection is maintained. Even if the signal electrode size varies due to fluctuation in the process conditions, the error rate of the cross-sectional area size is reduced. Accordingly, change in the characteristic impedance decreases and reflection of the high frequency signal can be suppressed.

To increase the cross-sectional area of the signal electrodes 103, the thickness of the signal electrodes 103 may be increased instead of or in addition to increase of the width of the signal line.

Figure 6:
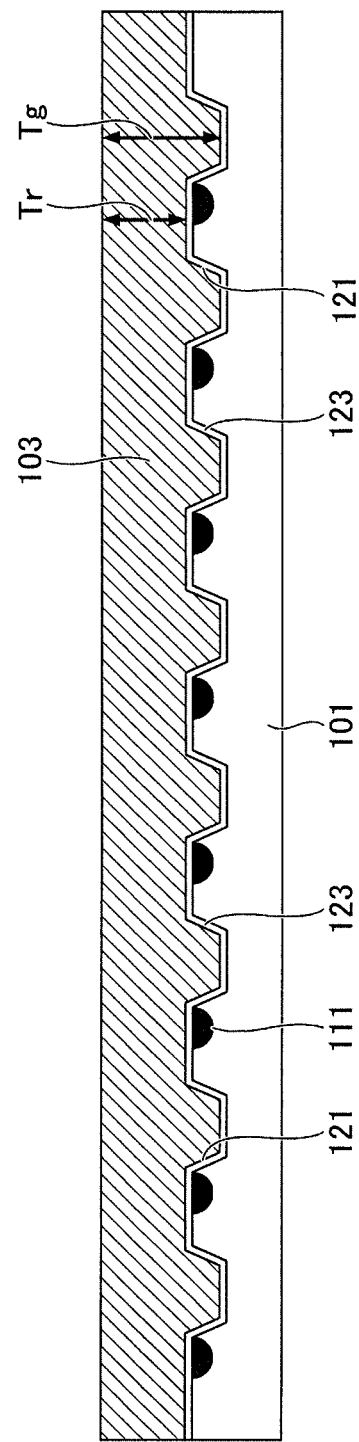
FIG. 6 is a schematic cross-sectional view of a configuration example in which the thickness of the signal electrodes is partially increased at a section intersecting the grooves.

FIG. 6 illustrates a configuration example of the signal electrode 103 with an increased thickness at the part intersecting the grooves 121 in the turn-back part 110A. Assuming that the thickness of the signal electrode 103 at the intersecting part across the groove 121 is Tg and that the thickness of the other part of the signal electrode 103 is Tr, the signal electrode 103 is formed so as to satisfy Tg>Tr. The thickness Tg of the signal electrode 103 intersecting the groove 121 is preferably greater than the depth of the groove 121 in order to prevent insufficient amount of vapor deposition of the electrode material at the edge of the groove 121 in a reliable manner.

In the turn-back part 110A, the surface of the signal electrodes 103 may not necessarily be flat. As long as Tg>Tr is satisfied and Tg is greater than the depth of the groove 121, the top face of the signal electrode 103 may be uneven reflecting the cross-sectional shape of the groove 121.

The thickness of the signal electrode 103 may be changed partially by repeating fabrication of a resist pattern and a plating process (regardless of whether wet or dry).

Returning again to FIG. 3, using the signal electrodes 103 electrically connected to the RF input terminals, high-frequency drive signals are input to the I channel and the Q channel of the IQ modulator 115 and the I channel and the Q channel of the IQ modulator 116, according to the logical values of the input data. The signal electrodes 103 are terminated at the side edge of the modulator chip 100 opposite to the interposer board 202 for DC supply.

A ground electrode 102 provides a reference potential level with respect to the electric signals applied to the signal electrodes 103. In this example, the substrate 101 is a Z-cut substrate in which the Z axis of the crystal is oriented in a direction perpendicular to the substrate surface. A signal electrode 103 is provided directly above one of the optical waveguides 111 of each sub MZI, and the ground electrode 102 is provided on the other optical waveguide 111 of the sub MZI.

Upon inputting the electric signal, an electric field is generated between the signal electrode 103 and the ground electrode 102, and the refractive indexes of the pair of optical waveguides 111 forming the MZ interferometer change because of the electro-optic effect. The optical phases of the propagation lights change, and the intensity of the optical signal combined at the output end of the MZ interferometer is modulated.

At the output of one of the IQ modulators 115 or 116, the direction of polarization of light is rotated by the polarization rotator "PR", and two polarized waves orthogonal to each other are multiplexed by the polarization beam combiner "PBC". For example, a TM wave is input from the input port $P_{in}$, split into two light components one for the IQ modulator 115 and the other for the IQ modulator 116, and the output light of the IQ modulator 115 is converted into a TE wave by the polarization rotator "PR". The TM wave output from the IQ modulator 116 and the polarization-rotated TE wave are multiplexed by the PBC. The multiplexed optical signal is output from the output port Pout to the transmission line (optical fiber).

In the configuration of FIG. 3, the cross-sectional area size of the signal electrodes 103 is expanded at the position intersecting the grooves 121 provided along the curved waveguides in the turn-back part 110A of the modulator chip 100. Degradation of the signal lines in the vicinity of the grooves 121 and variations in characteristic impedance of the signal lines due to process fluctuation are prevented. Accordingly, a compact and reliable optical modulator is achieved.

In addition, the DC electrodes 105 can be designed sufficiently long along the optical waveguides 111, and DC bias control voltage can be maintained low.

Second Embodiment

Figure 7:
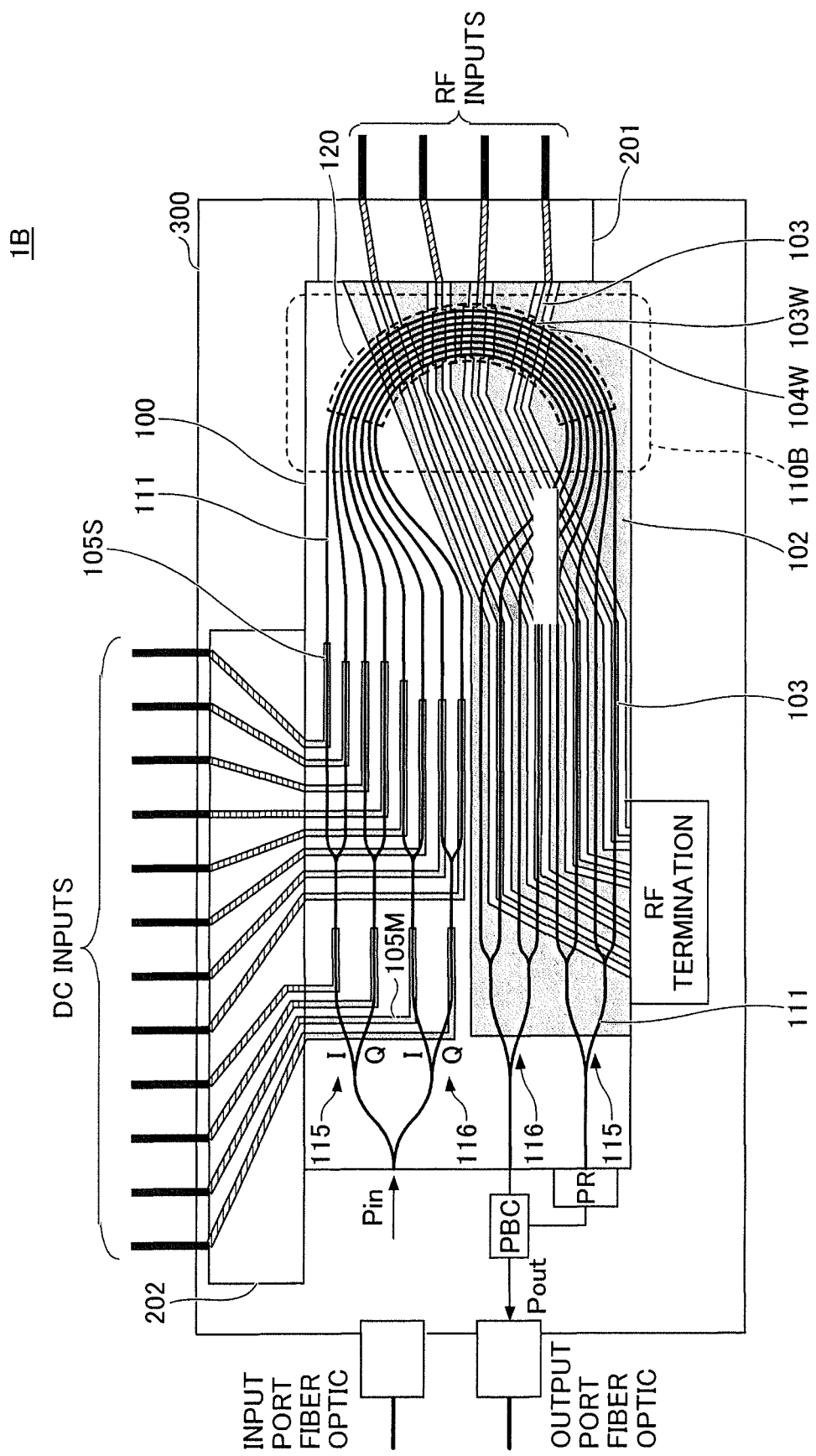
FIG. 7 illustrates a configuration of an optical modulator according to the second embodiment.

FIG. 7 is a schematic diagram of the optical modulator 1B according to the second embodiment. The optical modulator 1B employs as the basic structure the configuration of the optical modulator 1A of the first embodiment. The same components are denoted by the same symbols and redundant explanations are omitted.

The modulator chip 100 has a turn-back part 110B of the optical waveguides 111 on the side opposite to the optical input port $P_{in}$ and the optical output port $P_{out}$. The optical waveguides 111 bend such that the light propagation direction is converted by approximately 180 degrees in the turn-back part 110B. As in the first embodiment, the grooves 121 are formed along the curved waveguides.

In the second embodiment, the gap between a signal electrode 103 and a ground electrode 102 is adjusted correspondingly to the expansion of the cross-sectional area of the signal electrode 103 at the section intersecting the grooves 121.

Figure 8:
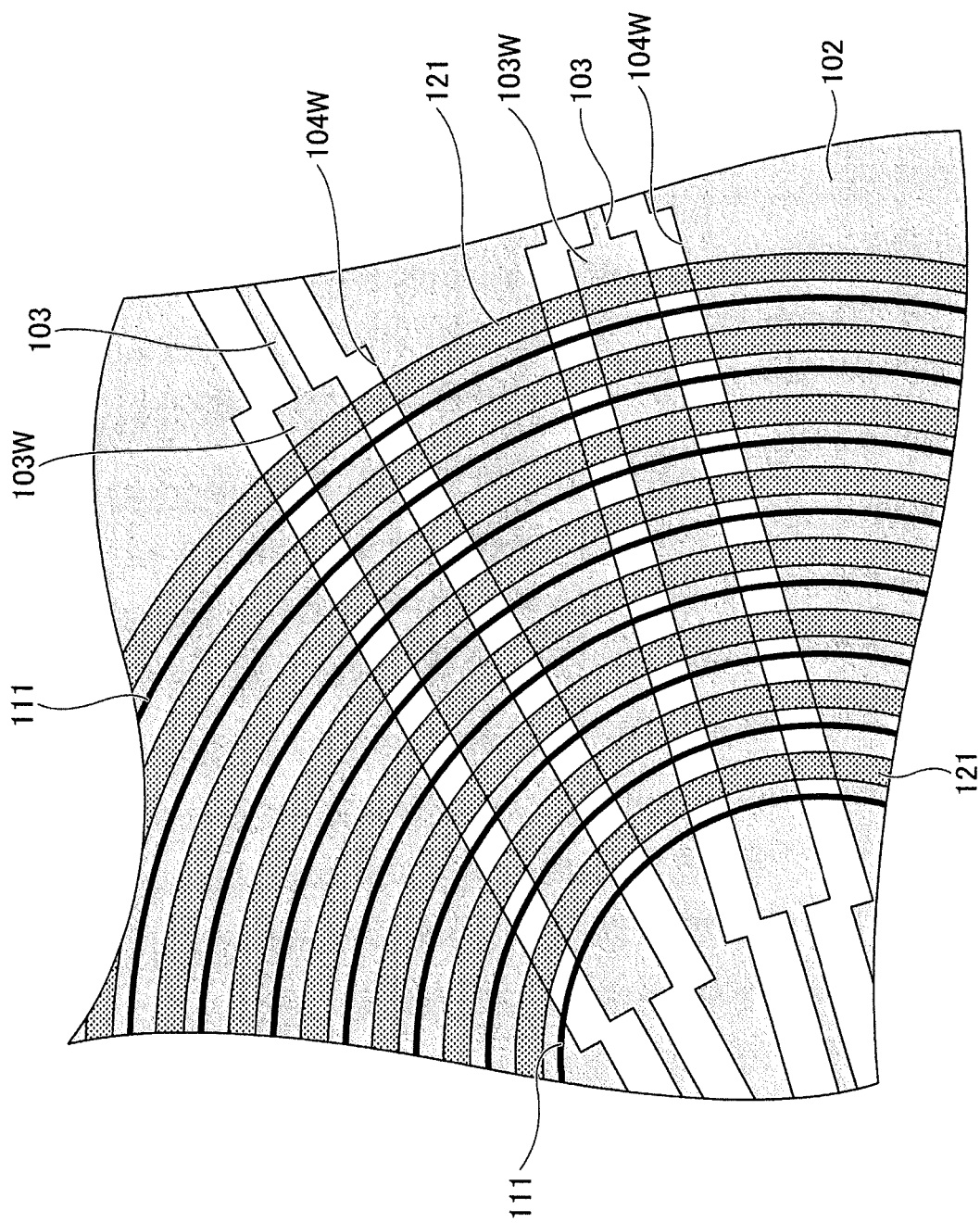
FIG. 8 is an enlarged view of the turn-back part of FIG. 7.

FIG. 8 is an enlarged view of the turn-back part 110B. The patterns of the ground electrodes 102 are adjusted at the sections adjacent to the expanded section of the signal electrode 103 in the area intersecting the grooves 121 provided along the curved waveguides. As the width of the signal electrode 103 is partially increased in order to increase its cross-sectional area, the characteristic impedance may decrease at the expanded section. To avoid this, a wide gap area 104W is provided around the expanded section 103W of the signal electrode 103 so as to provide an appropriate gap between the signal electrode 103 and the ground electrodes 102.

By providing the wide gap area 104W, the characteristic impedance of the high-frequency signal line is maintained constant and reflection of radio frequency signals can be suppressed.

The above-described pattern of the ground electrode 102 with a wide gap area 104W provided to a prescribed section is applicable to the configuration of the thickness-adjusted signal electrode 103 having a partially increased thickness in the section intersecting the grooves 121. With the increased cross-sectional area of the signal electrode 103 at the thickened section, the characteristic impedance of the high-frequency signal line may decrease at that section. By broadening the gap between the signal electrode 103 and the ground electrode 102 at the thickness-adjusted section, decrease in the characteristic impedance is compensated for. The characteristic impedance of the high-frequency signal line is maintained constant and reflection of a high-frequency signal component is suppressed.

The configuration of the second embodiment can achieve downsizing of the modulator chip 100 using the curved waveguides, while suppressing variations in characteristic impedance and maintaining the production yield of the modulator chip 100.

Third Embodiment

Figure 9:
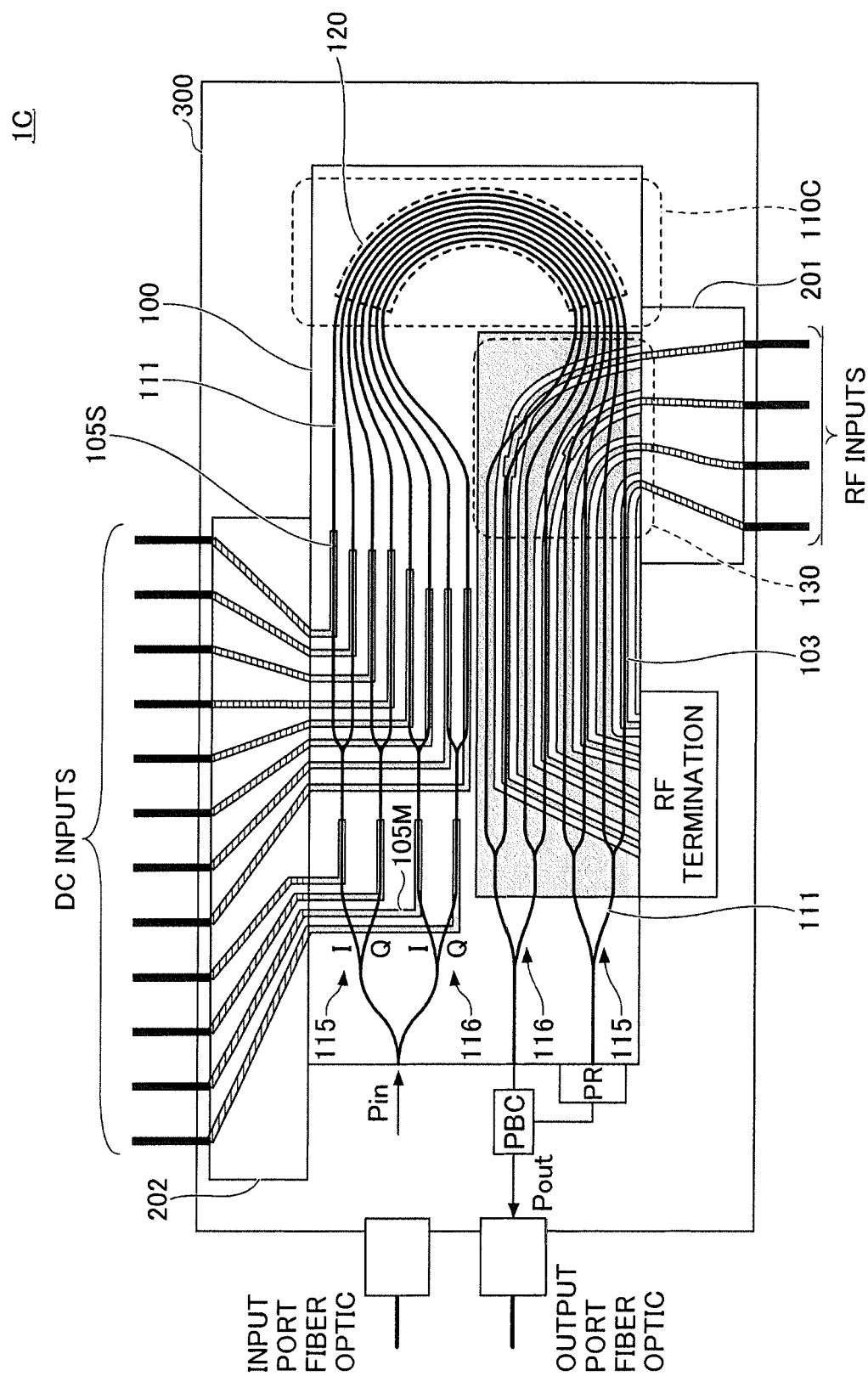
FIG. 9 illustrates a configuration of an optical modulator according to the third embodiment.

FIG. 9 is a schematic diagram of the optical modulator 1C according to the third embodiment. The optical modulator 1C employs as the basic structure the configuration of the optical modulator 1A of the first embodiment. The same components are denoted by the same symbols and redundant explanations are omitted.

In the third embodiment, the interposer board 201 for the RF input is provided on the side opposite to the interposer board 202 for the DC input of the modulator chip 100. The DC electrodes 105M and 105S are provided between the optical input port $Pi_n$ and the turn-back part 110C, in the region where the optical waveguide pairs forming MZ interferometers extend straight and parallel. The signal electrodes 103 are provided to the optical waveguides 111 in an area between the turn-back part 110C and the optical output port $P_{out}$.

Because the interposer board 201 is arranged to the side edge opposite to the interposer board 202, the signal electrodes 103 do not intersect the curved waveguides in the turn-back part 110C where the optical waveguides 111 bend at a small radius of curvature. However, next to the fold-back area 110C is a curved region 130 in which the optical waveguides 111 are still bending and extend with the distance between two adjacent waveguides gradually increasing toward optical output port $P_{out}$. In particular, the curvature of the optical waveguides 111 is strong inside the curve, and radiation loss of light would potentially occur at the strong curve.

To prevent this, second grooves 122 are provided to the curved region 130 along the outer curves of those optical waveguides 111 bending at a certain level of curvature, thereby suppressing radiation loss of light. By providing the second grooves 122 in the curved region 130 along the outer curve of the optical waveguides 111, the radius of curvature of the optical waveguide 111 may be maintained as small as possible, and the modulator chip 100 is made compact.

Figure 10:
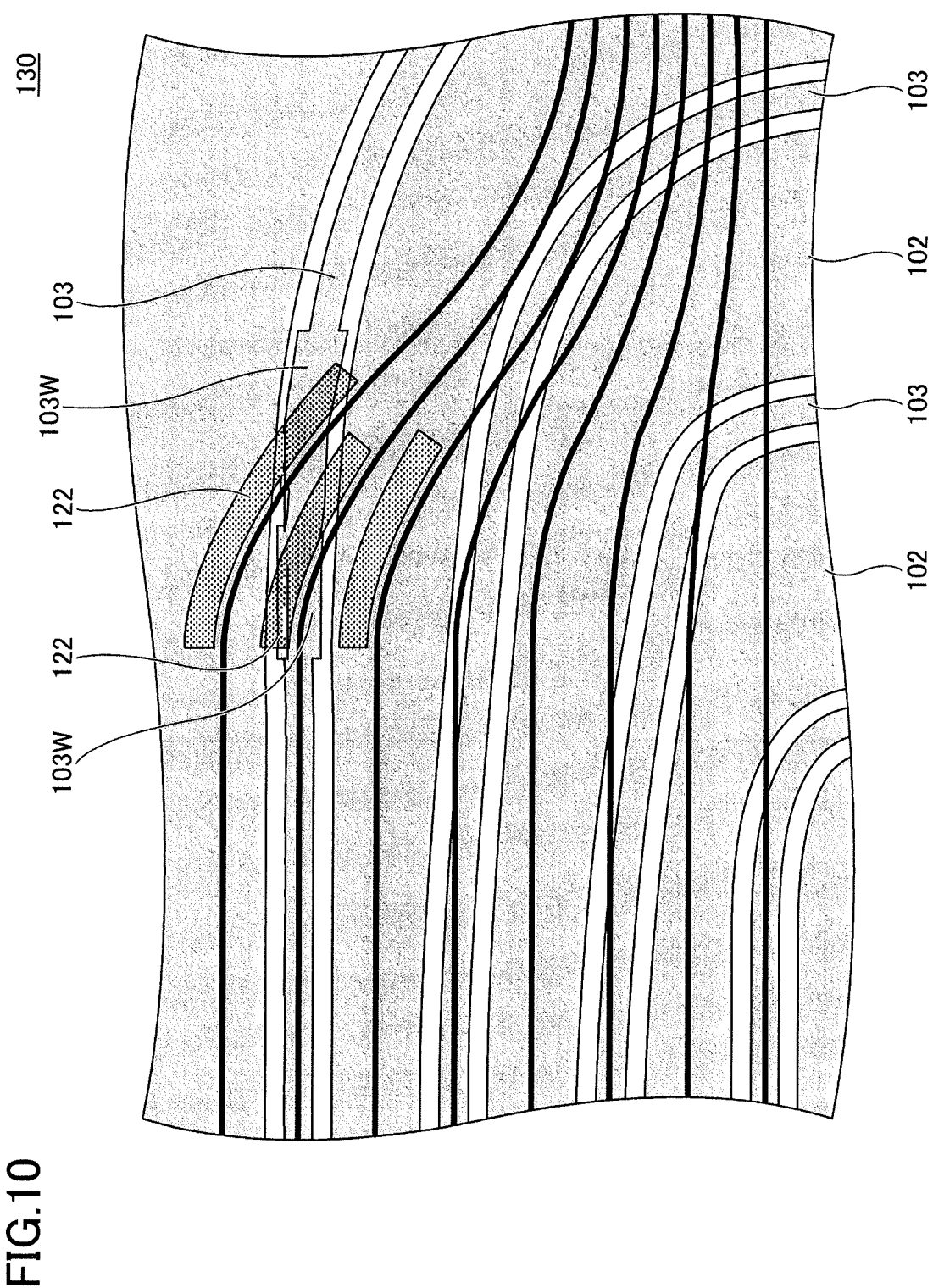
FIG. 10 is an enlarged view of the second groove area of FIG. 9.

FIG. 10 is an enlarged view of the curved region 130. A part or all of the signal electrodes 103 may come across or intersect the second grooves 122 formed in the curved region 130. Each of such signal electrodes 103 has an expanded section 103W with the cross-sectional area increased in the region intersecting with the second grooves 122. The cross-sectional area of the signal electrode 103 may be broadened by increasing at least one of the width and the thickness thereof.

Figure 11:
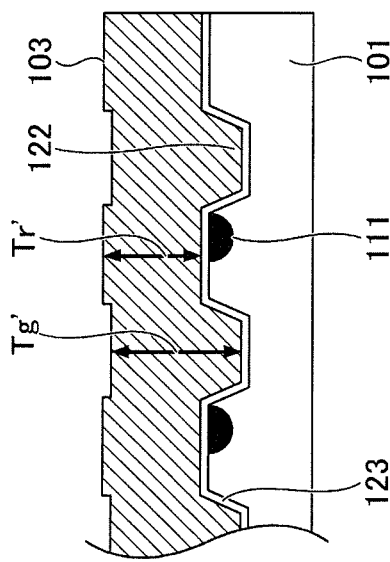
FIG. 11 is a cross-sectional view of a configuration example in which the thickness of the RF electrodes is increased at a position intersecting the second groove area.

In place of or addition to the configuration increasing the width of the signal electrode 103 at the section intersecting the second grooves 122, the thickness of the signal electrode 103 may be increased as illustrated in FIG. 11. Assuming that the thickness of the signal electrode 103 provided in the second grooves 122 is "Tg" and that the thickness of the signal electrode 103 located in the region other than the second grooves 122 is "Tr'", then the signal electrodes 103 are formed so as to satisfy Tg'>Tr'. By partially increasing the thickness of the signal electrode 103 at the section intersecting the second grooves 122, electrical or physical disconnection can be prevented, and the reliability is maintained in the downsized optical modulator 1C.

When the cross-sectional area of the signal electrodes 103 is partially increased at the section intersecting the second grooves 122, the patterns of the ground electrodes 102 may be adjusted so as to maintain or widen the gap around the expanded sections of the signal electrodes 103 as in the second embodiment. By providing an appropriate amount of gap between the signal electrode 103 and the ground electrode 102, the characteristic impedance of the high-frequency signal line can be maintained stable.

<Applications to Optical Transceiver Module>

Figure 12:
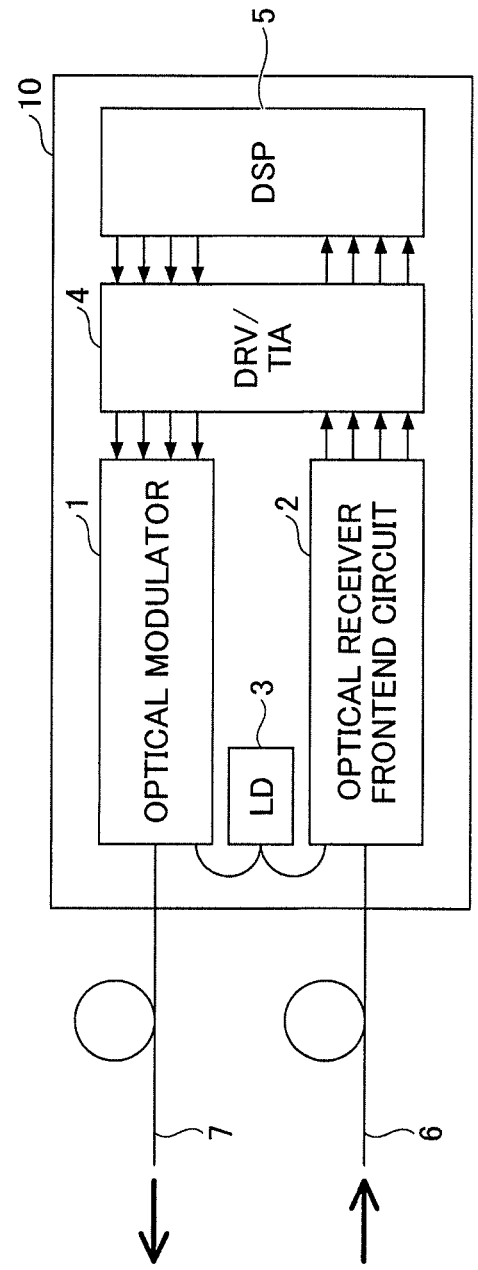
FIG. 12 is a schematic block diagram of an optical module using the optical modulator of an embodiment.

FIG. 12 is a schematic block diagram of an optical transceiver module 10 using the optical modulator 1 of an embodiment. The optical module 10 has an optical modulator 1, an optical frontend receiver circuit 2, a light source 3 such as a laser diode (LD), an electric circuit chip 4, and a signal processor 5 such as a digital signal processor (DSP). Any one of the optical modulators 1A to 1C of the first to third embodiments may be used as the optical modulator 1.

The electric circuit chip 4 may include a driver (DRV) for generating a high-speed drive signal for driving the optical modulator 1 based upon input data, and a transimpedance amplifier (TIA) for converting a photocurrent signal supplied from the optical frontend receiver circuit 2 into an electric voltage signal. When the optical modulator 1 is packaged in a package 300 in which a modulator chip 100 and interposer boards 201 and 202 are provided as in the above-described embodiments, the driver circuit may be arranged in the package 300 of the optical modulator 1. In the configuration of the third embodiment in which there is an open space at the end part opposite to the input and output ports of the modulator chip 100, the space inside the package 300 may be utilized in an efficient manner.

A portion of the light beam output from the light source 3 is input to the optical modulator 1 and the rest of the light is input to the optical frontend receiver circuit 2. The light component supplied to the optical modulator 1 is received at the optical input port $P_{in}$ of the modulator chip 100. The optical signal modulated by the optical modulator 1 according to the input data is output to the optical fiber 7. The other light component supplied from the light source 3 to the optical frontend receiver circuit 2 is used as a local oscillator light to detect an optical signal received from the optical fiber 6.

The DSP 5 generates a data signal to be input to the optical modulator 1 by the driver circuit. The DSP 5 also converts the analog electric signal detected by the optical frontend receiver circuit 2 and produced as an electrical voltage signal by the electric circuit chip 4 into a digital form and demodulates the received signal.

In this optical transceiver module 10, the optical modulator 1 has a turn-back part 110 in which the optical waveguides are turned back by almost 180 degrees, and accordingly, the modulator chip itself is made compact. A groove for providing an air layer is provided along the outer periphery of the curved waveguide in the turn-back part 110 or the curved waveguide extending from the turn-back part 110 toward the straight or parallel part, thereby suppressing radiation loss of light. The cross-sectional area of the signal electrode 103 is partially increased at the section intersecting the grooves. Accordingly, disconnection or degradation of the interconnects is suppressed and undesirable influence of fluctuation of the characteristic impedance due to process variation is reduced. Thus, a compact and stable optical transceiver module 10 is achieved.

The invention is not limited to the above-described embodiments, and there are many modifications and alterations within the scope of the invention. The configurations of the above-described embodiments are applicable not only to a DP-QPSK optical modulator, but also to any suitable optical modulators such as 16-QAM or QPSK optical modulators with 180-degree bending waveguides. For long distance optical transfer, an optical modulator making use of the electro-optic effect and with less optical loss is preferable. However, the electrode structure of the embodiments may also be applied to a semiconductor optical modulator making use of the electro-absorption effect. For example, when a plurality of MZI-type silicon waveguides are bent at a small radius of curvature and when velocity matching is required between the high-frequency electrical modulation signal and the propagation speed of light traveling through the silicon waveguides, the electrode structure of the embodiments is effectively applicable.

Although in the above-described embodiment the DC electrodes 105 are provided on the light input side while the signal electrodes 103 are provided on the light output side, the invention is not limited to this configuration. The above-described configurations of the embodiments are applicable to a layout in which both the RF inputs and RF termination are provided to the light input side and the signal electrodes 103 intersect the grooves formed along the curved waveguides.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical modulator comprising:
   a substrate;
   an optical input port and an optical output port provided on a same end of the substrate;
   an optical waveguide pair provided in the substrate and configured to form a Mach-Zehnder interferometer, one end of the optical waveguide pair being connected to the optical input port and the other end of the optical waveguide pair being connected to the optical output port, the optical waveguide pair having a bending part;
   a groove provided along the optical waveguide pair in the bending part; and
   a signal electrode that applies a high-frequency electrical signal to the optical waveguide pair,
   wherein the signal electrode has an expanded section having an increased cross sectional area at a section intersecting the groove by covering an edge and a bottom of the groove formed in the substrate, and
   wherein a width of the signal electrode is increased in a section extending across the groove along a longitudinal axis of the signal electrode such that the expanded section becomes wider than another section that does not intersect the groove.

2. The optical modulator as claimed in claim 1, wherein a thickness of the expanded section of the signal electrode is greater than the thickness of another section that does not intersect the groove.

3. The optical modulator as claimed in claim 1, further comprising:
   a ground electrode provided to a same plane with the signal electrode on the substrate,
   wherein a gap between the signal electrode and the ground electrode is broadened around the expanded section of the signal electrode.

4. The optical modulator as claimed in claim 2, further comprising:
   a ground electrode provided to a same plane with the signal electrode on the substrate,
   wherein a gap between the signal electrode and the ground electrode is broadened around the expanded section of the signal electrode.

5. The optical modulator as claimed in claim 1, wherein a thickness of the expanded section of the signal electrode is greater than a depth of the groove at the section intersecting the groove.

6. The optical modulator as claimed in claim 2, wherein the thickness of the expanded section of the signal electrode is greater than a depth of the groove at the section intersecting the groove.

7. The optical modulator as claimed in claim 3, wherein a thickness of the expanded section of the signal electrode is greater than a depth of the groove at the section intersecting the groove.

8. The optical modulator as claimed in claim 4, wherein the thickness of the expanded section of the signal electrode is greater than a depth of the groove at the section intersecting the groove.

9. The optical modulator as claimed in claim 1, wherein the bending part of the optical waveguide pair forms a bending waveguide at which a direction of propagation of light is turned back by 180 degrees, and wherein the groove is formed along an outer curve of the bending waveguide.

10. The optical modulator as claimed in claim 1, wherein the optical waveguide pair has a turn-back part in which a direction of propagation of light is turned back by 180 degrees, wherein the bending part of the optical waveguide pair is in a curved region located between the turn-back part and the optical input port or the optical output port, in the curved region a distance between the optical waveguide pair changing, and wherein the groove is formed along an outer curve of the optical waveguide pair in the curved region.

11. An optical transceiver module comprising:

an optical transmitter having an optical modulator; and an optical receiver, wherein the optical modulator has a substrate;

an optical input port and an optical output port provided on a same end of the substrate;

an optical waveguide pair provided in the substrate and configured to form a Mach-Zehnder interferometer, one end of the optical waveguide pair being connected to the optical input port and the other end of the optical waveguide pair being connected to the optical output port, the optical waveguide pair having a bending part;

a groove provided along the optical waveguide pair in the bending part; and a signal electrode that applies a high-frequency electrical signal to the optical waveguide pair, wherein the signal electrode has an expanded section having an increased cross sectional area at a section intersecting the groove by covering an edge and a bottom of the groove formed in the substrate, and wherein a width of the signal electrode is increased in a section extending across the groove along a longitudinal axis of the signal electrode such that the expanded section becomes wider than another section that does not intersect the groove.

* * * * *